Dec. 23, 1924.                                                                     1,520,151
M. H. SLATER
COVER FOR LOOSE LEAF FOLDERS OR BOOKS
Filed May 1, 1924

Inventor:
Mabel H. Slater,
by her attorney,
Charles L. Gooding.

Patented Dec. 23, 1924.

1,520,151

UNITED STATES PATENT OFFICE.

MABEL H. SLATER, OF NEW YORK, N. Y.

COVER FOR LOOSE-LEAF FOLDERS OR BOOKS.

Application filed May 1, 1924. Serial No. 710,315.

*To all whom it may concern:*

Be it known that I, MABEL H. SLATER, a citizen of the United States, residing at New York, in the county of New York and State of New York, have invented new and useful Improvements in Covers for Loose-Leaf Folders or Books, of which the following is a specification.

This invention relates to a cover for loose-leaf folders, books, or the like.

The object of the invention is to provide a cover especially adapted for animal books or loose-leaf folders for children, although it is to be understood that the invention is not restricted to any particular class of loose-leaf folder or book, but that the cover preferably represents, as a whole, some animal, such as an owl, and embodies therein a head member with openings for the eyes, and iris members shiftably positioned independent of each other upon the cover, preferably on the rear side thereof, which may assume different positions relatively to the eye openings and to each other, thus creating an amusing and interesting device, especially for children.

The object of the invention is further to provide means whereby a pair of eyeglass frames may be held in position relatively to the eye openings and preferably the eyeglass frame is held in such a position by a flexible or elastic member such as a cord or elastic band, extending around the back of the cover and thus providing a means for holding the eyeglass frame in position and also for binding to the front cover a back cover, whereby sheets of printed material, as for instance, stories in relation to birds or animals, or descriptions of the same, may be held between the covers.

It is to be understood that while preferably the cover represents some bird or animal, it may be of a design representing a doll.

To these ends the invention consists in a cover for a loose-leaf folder, book, or the like, with a head member having eye openings therein and a receptacle on the inside of the cover with iris members shiftably positioned in the receptacle in alignment with the openings.

The invention further consists in a supporting member provided with an eye opening and a receptacle containing a shiftable iris member, the receptacle having a chamber therein in which there is a track along which the iris member may travel and assume different positions relatively to the eye opening. The track is preferably provided at its opposite ends with a pair of pockets and with a depression intermediate the pockets, so that the iris member may be positioned at either end of the eye or at the middle of the eye, and this positioning of the iris member in the depressed portion of the track requires considerable practice and skill on the part of the user, so that the invention contemplates not only amusing the users, but rendering them skillful in the use of their hands and eyes.

The invention still further consists in an article of manufacture such as hereinafter described in the specification and particularly pointed out in the claims.

Referring to the drawings.

Like numerals refer to like parts throughout the several views of the drawings.

Figure 1:
Figure 1 is a front elevation of my improved cover for loose-leaf folders, the same being designed to illustrate an owl.
Figure 2:
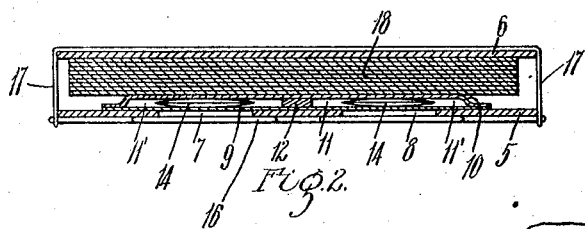
Fig. 2 is a sectional plan enlarged and taken on the line 2—2 of Figure 1.
Figure 3:
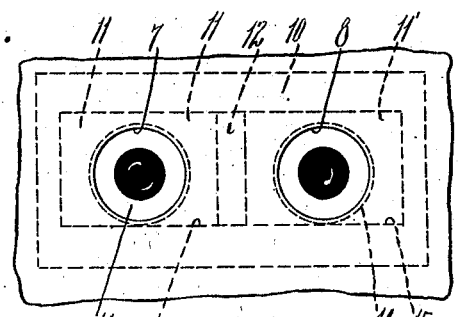
Fig. 3 is an enlarged front elevation of the eye portions of the device.

In the drawings, referring to Figures 1 to 3 inclusive, 5 is the front cover and 6 the back cover of a loose-leaf folder. The front cover is provided with eye openings 7 and 8. A sheet of celluloid or other transparent sheet material 9 extends across the openings 7 and 8 at the rear thereof and is fastened to the inside surface of the cover 5. A receptacle 10, which may be of any kind of material, is fastened to the cover 5 and provides a chamber 11 therein which is sub-divided into two chambers 11' by a partition 12. Iris members 14 are contained within the chambers 11' in alignment with the eye openings 7 and 8, and these iris members are adapted to be shifted along tracks 15 when the cover is tipped from side to side, so that the iris members assume different positions relatively to their respective eye openings 7 and 8. The iris members are preferably disc shaped and are painted or otherwise colored to represent the iris of the eye.

A pair of eyeglass frames 16 are held in alignment with the openings 7 and 8 by an elastic band 17 which is fastened at its opposite ends to the opposite sides of the eyeglass frame and this elastic band extends around and across the back of the cover 6, thus holding the eyeglass frame in position and also holding the loose sheets 18 between the front and back covers.

It is evident that without departing from the spirit of my invention, if it is desired to use the front cover of the folder for purposes of amusement, the eyeglass frame may be held in position by an elastic or other flexible band attached to opposite sides of the eyeglass frame and extending around and along the back of the front cover, the back cover being dispensed with in this case.

Figure 4:
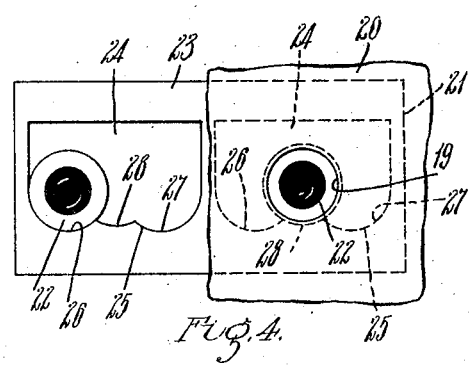
Fig. 4 is a front elevation partly in section illustrating my invention provided with a track for the iris member with pockets at the opposite ends thereof and with a depressed portion midway between the pockets, whereby the iris member can be positioned in the middle of the eye opening.

In Figure 4 I have illustrated a modified form of my invention in which 19 are openings in a piece of sheet material constituting a support for the eye members and in this figure the material of the supporting member 20 is removed from the left hand portion of the figure in order to more clearly illustrate this modified form of my invention. A strip of celluloid 21 is fastened in any suitable manner to the supporting member 20 as in the form of my invention illustrated in Figures 1 to 3 inclusive.

Iris members 22 are movable within a receptacle 23 similar to the receptacle 10 of that form of my invention illustrated in said Figures 1 to 3. This receptacle is provided with chambers 24, each of which has a track 25 in the lower portion thereof, upon which the iris members 22 are shiftably positioned, the iris members being disc shaped and colored, painted, or otherwise manufactured to represent the iris of an eye. The track 25 consists of two pockets 26 and 27 and between said pockets is a recessed portion 28, so that by tipping the supporting member in different positions, the iris members 22 can be positioned either in the pockets 26 or 27 or in the depressed portion 28 of the track.

In all other respects than the track 25, the embodiment of my invention illustrated in Figure 4 is the same as the embodiment of my invention illustrated in Figures 1, 2 and 3.

It is evident that while I have shown and described the track 25 in the embodiment of my invention illustrated in Figure 4, as supported upon a sheet of cardboard or the like, constituting a supporting member, I do not wish to confine my invention to a supporting member of this specific character, as a track of the character set forth with pockets at its opposite ends and a depressed portion midway between said pockets may be utilized in connection with the head of a doll having eye openings and with iris members positioned in the chambers in alignment with said eye openings without departing from the spirit of my invention.

I claim:

1. A cover for a loose-leaf folder, book, or the like, provided with a pair of openings and a pair of iris members shiftably positioned independent of each other inside said cover in alignment with said openings.

2. A cover for a loose-leaf folder, book, or the like, embodying a head member with a pair of eye openings therein, a receptacle on the inside of said cover and a pair of iris members shiftably positioned independent of each other in said receptacle in alignment with said eye openings.

3. A cover for a loose-leaf folder, book, or the like, provided with a pair of openings, a piece of transparent material extending across said openings, a receptacle extending across each of said openings and provided with a chamber and a pair of iris members shiftably positioned in said chamber in alignment with said openings.

4. A cover for a loose-leaf folder, book, or the like, embodying a head member with a pair of eye openings therein, a receptacle on the inside of said cover, a pair of iris members shiftably positioned in said receptacle in alignment with said eye openings, an eyeglass frame, and flexible means connected to opposite sides of said frame and extending along the back of said cover.

5. A pair of covers for a loose-leaf folder, book, or the like, one of said covers embodying a head member with a pair of eye openings therein on the inside of said cover, a receptacle on the cover, and a pair of iris members shiftably positioned in said receptacle in alignment with said eye openings, an eyeglass frame positioned on said last-named cover and flexible means connected to opposite sides of said frame and extending around the other of said covers, whereby said eyeglass frame may be held in position in alignment with said openings and said covers may be held together.

6. A cover for a loose-leaf folder, book, or the like, provided with a pair of openings, a receptacle provided with a chamber and fastened to said cover in alignment with and at the rear of said openings, a track in said receptacle at the rear of each of said openings respectively, each of said tracks terminating at its opposite ends in a pocket, and with a depressed portion in each of said tracks midway between said pockets, and an iris member in each of said chambers shiftably positioned therein and along its respective track and visible through its respective opening.

7. As an article of manufacture, an eye member comprising a receptacle provided with a chamber, a track in said receptacle terminating at its opposite ends in pockets and with a depressed portion in said track midway between said pockets, and an iris member shiftably positioned in said chamber and along said track and visible through said opening.

In testimony whereof I have hereunto set my hand.

MABEL H. SLATER.